No. 639,410. Patented Dec. 19, 1899.
E. G. LATTA.
VELOCIPEDE BEARING.
(Application filed Dec. 10, 1895.)
(No Model.)
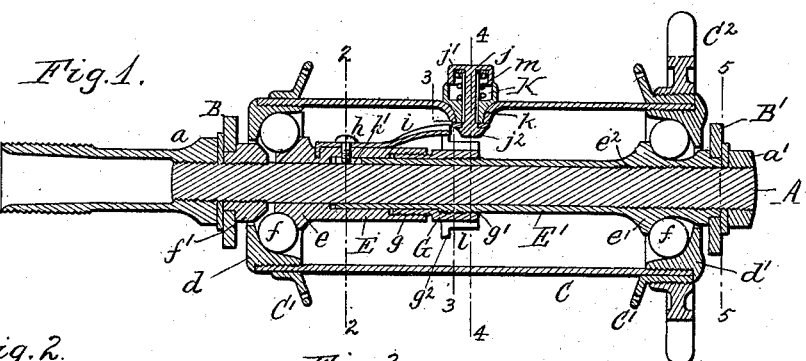
Witnesses:
Chas. F. Burkhardt
Henry L. Deck
E. G. Latta Inventor.
By Wilhelm & Bonner Attorneys

UNITED STATES PATENT OFFICE.

EMMIT G. LATTA, OF FRIENDSHIP, NEW YORK.

VELOCIPEDE-BEARING.

SPECIFICATION forming part of Letters Patent No. 639,410, dated December 19, 1899.

Application filed December 10, 1895. Serial No. 571,627. (No model.)

*To all whom it may concern:*

Be it known that I, EMMIT G. LATTA, a citizen of the United States, residing at Friendship, in the county of Allegany and State of New York, have invented new and useful Improvements in Velocipede-Bearings, of which the following is a specification.

This invention relates more especially to journal-bearings for velocipedes.

It has for its chief object to produce a journal-bearing that can be easily and almost instantly adjusted for wear without the use of tools.

The invention has the further objects to render the cups and cones capable of removal and replacement without disturbing the adjustment of the cones, to so construct the bearings that when applied to a wheel the wheel may be removed from and replaced in the frame without disturbing the bearings, and that the bearings may be adjusted without affecting the connections between the wheel and the frame and so that in the case of the driving-wheel the chain may be adjusted without danger of disturbing the bearing adjustment, and, finally, to attain these various objects in a hub or bearing-box having cups which are simply screwed into the ends thereof and inclose the balls and cones in the most approved manner to retain oil and exclude dust.

In the accompanying drawings, Figure 1 is a longitudinal sectional elevation of the rear-wheel hub and connecting parts of a velocipede containing my invention. Figs. 2, 3, 4, and 5 are cross-sections, respectively, in the correspondingly-numbered lines in Fig. 1. Fig. 6 is a view similar to Fig. 1, showing a modified construction of the bearing. Fig. 7 is a cross-section in line 7 7, Fig. 6.

Like letters of reference refer to like parts in the several figures.

A is the stationary shaft or axle of the wheel, which is secured by the usual clamping-nuts $a\ a'$ in openings or slots formed in the fork-arms or frame-lugs B B', the nut $a$ serving also as a step.

C is the wheel-hub, having the usual cylindrical form and provided at its ends with perforated flanges C' for the attachment of the spokes and at one end with the sprocket or driving wheel $C^2$.

$d\ d'$ are the bearing-cups, secured in the ends of the wheel-hub and preferably arranged to face inwardly, as shown.

$e\ e'$ are the bearing-cones, $f$ the interposed balls, and $f'$ a nut applied to the axle on the inner side of the adjacent fork-lug B and closing the annular space between the axle and the adjacent bearing-cup. The cones are connected by a sleeve which surrounds the axle A and which is preferably composed of two telescopic parts or sections E E', each carrying one of the cones. One of these sleeve-sections is arranged to slide lengthwise on the other, the left-hand section being shown in the drawings as the movable one. The other section engages with the axle by screw-threads $e^2$, formed on the respective parts, and it interlocks with the fork-lug, so as to be held against turning. For this purpose the outer end of the non-sliding sleeve-section may be flattened and extended into the flat-sided opening or slot of the fork-lug, as shown in Fig. 5. The two sleeve-sections are connected by an adjusting-collar G, having, preferably, differential or right and left hand screw-threads $g\ g'$, which engage, respectively, with the sleeve-sections E E'. In the construction shown in the drawings this adjusting-collar has an internal screw-thread which engages with the non-sliding sleeve-section E' and an external screw-thread of different pitch which engages with the sliding sleeve-section E. The latter is held against turning with reference to the non-sliding sleeve-section by a radial screw or pin $h$, carried by the sliding section and entering a longitudinal slot $h'$, formed in the other section. By this construction the movable cone $e$, carried by the sliding sleeve-section, is compelled to move toward or from the opposing bearing-cup upon turning the differential adjusting-collar in one or the other direction.

$i$ is a detent or spring which holds the adjusting-collar against accidental rotation and which is secured at one end to the sliding sleeve-section E, preferably by the screw $h$, and engages with its free end in one of an annular series of notches formed in a serrated flange $g^2$ of the adjusting-collar.

$j$ is a movable coupling bolt or plunger carried by the wheel-hub and adapted to engage with the adjusting-collar G, so as to compel the same to turn with the hub. This bolt or plunger is preferably combined with an oil-cup K, as shown in the drawings. The stem of this oil-cup is screwed into an opening or socket $k$ of the wheel-hub, and the bolt $j$ is guided in an axial opening formed in the stem, so as to be capable of sliding radially in the hub. The bolt is arranged opposite the enlarged head of the adjusting-collar G, and this head is provided with an annular series of notches $l$, with one of which the inner end of the bolt is adapted to interlock, as shown in Fig. 4. The bolt carries at its outer end a cap $j'$, which closes the outer end of the oil-cup K.

$m$ is a spring applied to the bolt $j$ between the cap $j'$ and the bottom of the oil-cup and serving to retract the bolt normally into a position in which it clears the adjusting-collar G, as shown in Fig. 1. The bolt is provided at its inner end with a head or shoulder $j^2$, which limits its outward movement by coming in contact with the inner end of the oil-cup.

The cap $j'$ is provided with an aperture $j^3$ for admitting oil to the oil-cup, and the bolt or plunger $j$ is provided in its sides with grooves or conduits $j^4$, whereby the oil flows from the cup into the wheel-hub.

As shown in the drawings, the screw-threaded right-hand end of the axle is as much larger in diameter than the body thereof as the size of the threads, while the opposite screw-threaded end of the axle is of the same diameter as its body.

In assembling the parts the sleeve-sections E E' are first connected by the differential adjusting-collar G, and the detent-spring $i$ is secured to the movable section by the screw $h$. The sleeve is then placed into the wheel-hub and supported and held in position therein by inserting the balls and applying the bearing-cups to the ends of the hub. The nut $f'$ is next placed in the open center of the left-hand cup, and the wheel is thereupon placed in the frame. Then the axle is passed into the cone-carrying sleeve from the right-hand end thereof and screwed into said end and into the nut $f'$ at the left-hand end of the sleeve. Next the end nut $a'$ and step $a$ are loosely screwed upon the axle. The driving-chain is then adjusted, and, finally, said nut and step are tightened to firmly secure the axle to the frame.

By making the screw-threaded portions of the axle of different diameters, as shown, the axle can be screwed into the sleeve from the right, and after passing through the sleeve its smaller thread can be screwed into the nut opposite the left-hand end of the wheel-hub, permitting each end of the axle to be locked to the bicycle-frame independently. This particular construction is, however, not essential and may be modified, if desired.

In order to adjust the bearings, the coupling bolt or plunger $j$ is pressed inwardly, so as to interlock it with an opposing notch of the adjusting-collar G, as shown in Fig. 4, and the wheel is then turned, so as to turn said collar. As the sliding sleeve-section E is held against turning, the differential screw connection between the adjusting-collar and the sections of the coned sleeve compels the sliding section to move toward or from the opposing bearing-cup, according to the direction in which the wheel is turned, thus practically lengthening or shortening the connecting-sleeve of the cones. The spring-detent $i$ automatically locks the adjusting-collar in place, and the coupling-bolt $j$ on being released is returned to its normal position by its spring.

While I prefer to employ a plunger or coupling-bolt which is permanently attached to the hub or bearing-box, it is obvious that the bolt might be dispensed with and the adjusting-collar held against turning in adjusting the bearing by a suitable implement—such as a screw-driver, a nail, or a piece of wire passed through the opening in the wall of the hub or bearing-box and engaged with a notch of said collar.

Sufficient space is left between the nut $f'$ at the left-hand end of the hub and the adjacent cone $e$ to permit the requisite outward movement of the coned sleeve in adjusting the bearings. This permits the bearings to be adjusted without disturbing the nuts or connections between the axle and the frame of the machine.

When it is desired to remove the wheel from the frame, the axle is released by removing the end nuts $a$ $a'$, and the axle is then unscrewed from the coned sleeve E E'. The wheel is then moved forward in the frame to loosen the chain, which latter can now be removed from the sprocket-wheel, and the wheel is then taken out of the frame without withdrawing the joint-bolt from the driving-chain. This is an important advantage, as the frequent removal of the joint-bolt causes the same to wear loose. By the use of my improved bearing, after replacing the wheel in the frame, the adjustment of the bearings is the same as it was before the removal of the wheel.

The outer ends of the nut $f'$ and the fixed cone $e^3$ are reduced, as shown, so as to form stops or shoulders against which the frame members bear and against which they are clamped by the nuts $a$ $a'$.

In the modified construction of my improvement shown in Figs. 6 and 7 the cones $e^3$ $e^4$ are independent and mounted directly on the axle. The right-hand cone $e^3$ is screwed upon the axle, while the left-hand cone is formed on the sliding sleeve $E^2$, which latter is held against turning by the screw $h^2$ engaging in a longitudinal slot in the axle. In this case the internal screw-thread of the differential adjusting-collar G' engages with an external thread on the axle. In other respects the construction is the same as that first described. This modified bearing is adjusted in the same manner as in the construction previously described; but the axle cannot be detached without disturbing the bearing.

I claim as my invention—

1. The combination with a hub or bearing-box having a bearing-cup, a cone and an interposed row of balls at each end thereof, of a shaft or axle passing centrally through said hub or box, a rotary adjusting-collar surrounding the shaft or axle between said cones and acting to move one of the cones lengthwise of the axle, and a coupling device carried by said hub or box and arranged to engage with said adjusting-collar, said coupling device being accessible from the outside of the hub or box, substantially as set forth.

2. The combination with a hub or bearing-box having a bearing-cup, a cone and an interposed row of balls at each end thereof, of a shaft or axle passing centrally through said hub or box, a rotary adjusting-collar surrounding the shaft or axle between said cones and acting to move one of the cones lengthwise of the axle, a coupling-bolt sliding in an opening in said hub or box and adapted to interlock with said adjusting-collar, and a spring whereby said bolt is normally retracted, substantially as set forth.

3. The combination with a hub or bearing-box having a bearing-cup, a cone and an interposed row of balls at each end thereof, of a shaft or axle passing centrally through said hub or box, a rotary adjusting-collar surrounding the shaft or axle between said cones and acting to move one of the cones lengthwise of the axle, a spring-bolt sliding in an opening in said hub or box and adapted to interlock with said adjusting-collar, and a spring-detent for yieldingly holding said collar against turning, substantially as set forth.

EMMIT G. LATTA.

Witnesses:
H. L. BLOSSOM,
C. J. RICE.